(12) United States Patent
Kulkarni et al.

(10) Patent No.: US 10,860,796 B2
(45) Date of Patent: Dec. 8, 2020

(54) METHOD AND SYSTEM FOR VECTOR REPRESENTATION OF LINEARLY PROGRESSING ENTITIES

(71) Applicant: Gluru Limited, London (GB)

(72) Inventors: Ritwik Kulkarni, London (GB); Michele Sama, London (GB); Tim Porter, London (GB)

(73) Assignee: Gluru Limited

( * ) Notice: Subject to any disclaimer, the term of this patent is extended or adjusted under 35 U.S.C. 154(b) by 86 days.

(21) Appl. No.: 15/981,878

(22) Filed: May 16, 2018

(65) Prior Publication Data

US 2018/0373694 A1  Dec. 27, 2018

Related U.S. Application Data

(60) Provisional application No. 62/507,083, filed on May 16, 2017.

(51) Int. Cl.
*G06F 40/258* (2020.01)
*G06F 17/16* (2006.01)
(Continued)

(52) U.S. Cl.
CPC .......... *G06F 40/258* (2020.01); *G06F 16/243* (2019.01); *G06F 16/3347* (2019.01); *G06F 17/16* (2013.01); *G06F 40/30* (2020.01); *G06N 3/126* (2013.01); *G06N 20/00* (2019.01); *G06N 3/08* (2013.01)

(58) Field of Classification Search
None
See application file for complete search history.

(56) References Cited

U.S. PATENT DOCUMENTS 5,331,554 A * 7/1994 Graham ................ G06F 16/322
5,982,441 A * 11/1999 Hurd ...................... H04N 19/96
348/417.1
(Continued)

OTHER PUBLICATIONS

Blei, David M. et al., "Latent Dirichlet allocation," Journal of Machine Learning Research 3: (Jan. 2003) 993-1022. doi:10.1162/jmlr.2003.3.4-5.993.
(Continued)

*Primary Examiner* — Marcus T Riley
(74) *Attorney, Agent, or Firm* — Scheinberg & Associates, PC; John B. Kelly

(57) ABSTRACT

A method and system to generate vectors that represent linearly progressing entities like time are disclosed. Traditional methods of vectorisation account for semantic or associative similarity of the entities. Thus, vectors conveying semantic information do not convey structural relations between such entities. The method allows for the representation of such structural information, for example the months in a year. The vectors generated by the invention encode this relation between the months such that one can interpret the sequence of the months, the difference between then and their cyclic nature. The method works in a manner similar to a genetic code, where subsequent "child" vectors are generated by related "parents", thus encoding the similarity and the distance of the sequential entities. An object of the inventions to allow algorithms in machine learning to easily learn over temporal entities its natural text.

18 Claims, 4 Drawing Sheets

(51) Int. Cl.
*G06N 20/00* (2019.01)
*G06F 16/242* (2019.01)
*G06F 16/33* (2019.01)
*G06N 3/12* (2006.01)
*G06F 40/30* (2020.01)
*G06N 3/08* (2006.01)

(56) References Cited

U.S. PATENT DOCUMENTS

| | | | | |
|---|---|---|---|---|
| 6,633,836 | B1* | 10/2003 | Yamaura | G06T 17/20 |
| | | | | 345/423 |
| 9,424,298 | B2* | 8/2016 | Bufe | G06F 16/93 |
| 9,424,299 | B2* | 8/2016 | Bufe | G06F 40/30 |
| 9,461,876 | B2* | 10/2016 | Van Dusen | G06N 5/02 |
| 9,515,666 | B2* | 12/2016 | Pavao-Moreira | H03B 5/00 |
| 2002/0138353 | A1* | 9/2002 | Schreiber | G06F 16/9024 |
| | | | | 705/26.1 |
| 2011/0264699 | A1* | 10/2011 | Antonelli | G06F 16/353 |
| | | | | 707/777 |
| 2014/0032455 | A1* | 1/2014 | Lye | G06N 3/126 |
| | | | | 706/13 |
| 2014/0075004 | A1* | 3/2014 | Van Dusen | G06F 16/90335 |
| | | | | 709/223 |
| 2014/0323142 | A1* | 10/2014 | Rodriguez | G10L 17/005 |
| | | | | 455/452.1 |
| 2016/0098398 | A1* | 4/2016 | Bufe | G06F 16/313 |
| | | | | 707/741 |
| 2016/0351074 | A1* | 12/2016 | Paul | A61B 5/7264 |
| 2017/0161624 | A1 | 6/2017 | Porter et al. | |
| 2017/0235848 | A1* | 8/2017 | Van Dusen | G06F 16/904 |
| | | | | 705/12 |
| 2018/0060793 | A1 | 3/2018 | Sama et al. | |
| 2018/0077100 | A1 | 3/2018 | Sama et al. | |
| 2018/0150768 | A1 | 5/2018 | Togia et al. | |
| 2018/0373694 | A1* | 12/2018 | Kulkarni | G06F 40/30 |

OTHER PUBLICATIONS

Casali, Ana, et al., 'A Tourism Recommender Agent: from theory to practice,' Intelegencia Artificial, Revista Iberamericana de Intelegencia Artificial, (2008) pp. 23-28, vol. 12, No. 40.

Chang, Angel X. et al., "SUTIME: A Library for Recognizing and Normalizing Time Expressions," (2012) 8th International Conference on Language Resources and Evaluation (LREC 2012).

Guidelines for Temporal Expression Annotation for English for TempEval ( Aug. 14, 2009). TimeML Working Group.

* cited by examiner

| Ranked similarity to the vector of *January* | | | |
|---|---|---|---|
| This Invention | Month Number | Word2Vec | Month Number |
| February (0.983) | 2 | February (0.967) | 2 |
| March (0.968) | 3 | October (0.949) | 10 |
| April (0.953) | 4 | December (0.940) | 12 |
| May (0.939) | 5 | November (0.932) | 11 |
| June (0.926) | 6 | August (0.925) | 8 |
| July (0.914) | 7 | September (0.913) | 9 |
| August (0.903) | 8 | March (0.893) | 3 |
| September (0.892) | 9 | April (0.874) | 4 |
| October (0.881) | 10 | June (0.873) | 6 |
| November (0.871) | 11 | July (0.862) | 7 |
| December (0.862) | 12 | May (0.850) | 5 |

FIG. 4

METHOD AND SYSTEM FOR VECTOR REPRESENTATION OF LINEARLY PROGRESSING ENTITIES

The present application claims priority from US Provisional Patent Application No. 62/507,083, filed May 16, 2017, which is hereby incorporated by reference.

TECHNICAL FIELD OF THE INVENTION

The technical field of the invention relates to the field of vector space modelling of information.

BACKGROUND OF THE INVENTION

In vector space modelling, information, most popularly textual information, is projected in a high dimensional space in such a manner that the spread of entities in the vector space is informative about the relation between those entities. One can then use algebraic operations on the vectorised entities to extract useful information.

Traditional forms of vector space modelling focus only on the relative similarity between vectors where the similarity reflects the closeness over a certain measure like the semantics of the entities. Such similarity is measured with different forms of a distance measure, for example, Euclidean distance, Hamming distance, Cosine similarity etc. Structural information is however missing in these types of vector space modelling. For example, in one of the most popular forms of word vector generator, Word2Vec, the vectors for words like "January", "February" and so on are located close to each other, hence show a high similarity but there is no way to infer that these months occur in a sequence. In other words, by looking at the vectors we cannot know that "January" precedes "February" or that the distance between "January" and "February" is the same as "February" and "March". What is needed is a way of solving this issue by generating vectors that encode the structural information of linearly progressing entities.

For the purposes of information retrieval, Natural Language Processing (NLP) holds high importance. Traditional vector space modelling does not naturally deal with temporal information as inferred by humans. For example, sentences like "The shop will open after April" or "The meeting is between 10 and 11" clearly mention time-related entities. When these sentences are vectorised, it is crucial to know that the vector for "May" is just after the vector for "April", when the shop will be open. Similarly 10 and 11 are ordinal numbers and it is not enough to just know that they are numbers. What is needed is a way to address this issue where temporal information is encoded into vectors in a manner that has a natural interpretation.

Thus, what is needed is a solution that addresses the need to have structural information encoded in vector space modelling which goes beyond simple similarity and allows information processing, especially in temporal contexts to be directly interpreted in NLP scenarios.

SUMMARY OF THE INVENTION

An object of the invention is to extend the existing method of vector space modelling in the case of ordinal entities like information in the temporal domain. It will allow a representation of ordinal entities in the vector space, in some ways, akin to their representation on a number line. Thus, embodiments of the present the invention will facilitate a natural interpretation of entities like months, days of the month, hours in a day, minutes in an hour and other entities of similar nature, when such entities are projected in the vector space.

Another object of the invention is to aid neural networks to easily process such ordinal entities. For example, embodiments of the present invention allow neural networks to easily associate a time vector to a vector representing another variable of interest. Since the time vector is encoded in a way that relates spatially to other time vectors, the neural network will be able to learn the temporal patterns in the data of interest.

Another object of the invention is to generate vectors in such a way that, with some processing the vectors can also convey information on cyclic patterns. For example, the similarity function can be composed in a way that even though vectors for "January" and "December" show the least similarity when put in context of the "Year" vector, the vectors for January 2017 and December 2016 will show a high similarity because they are adjacent months on the timeline.

Embodiments of the present invention generate vectors that represent linearly progressing entities like time is disclosed. Traditional methods of vectorisation account for semantic or associative similarity of the entities. Thus, vectors conveying semantic information do not convey structural relations between such entities. This invention allows for the representation of such structural information, for example the months in a year. The vectors generated by the invention encode this relation between the months such that one can interpret the sequence of the months, the difference between then and their cyclic nature. The invention works in a manner to a genetic code, where subsequent "child" vectors are generated by related "parents", thus encoding the similarity and the distance of the sequential entities. The ultimate goal of the invention is to allow algorithms in machine learning to easily learn over temporal entities in natural text.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIG. 4 shows the vectors most similar to "January" using the vectors generated by an embodiment of the present invention and vectors generated by a prior art system.

DETAILED DESCRIPTION OF PREFERRED EMBODIMENTS

Figure 1:
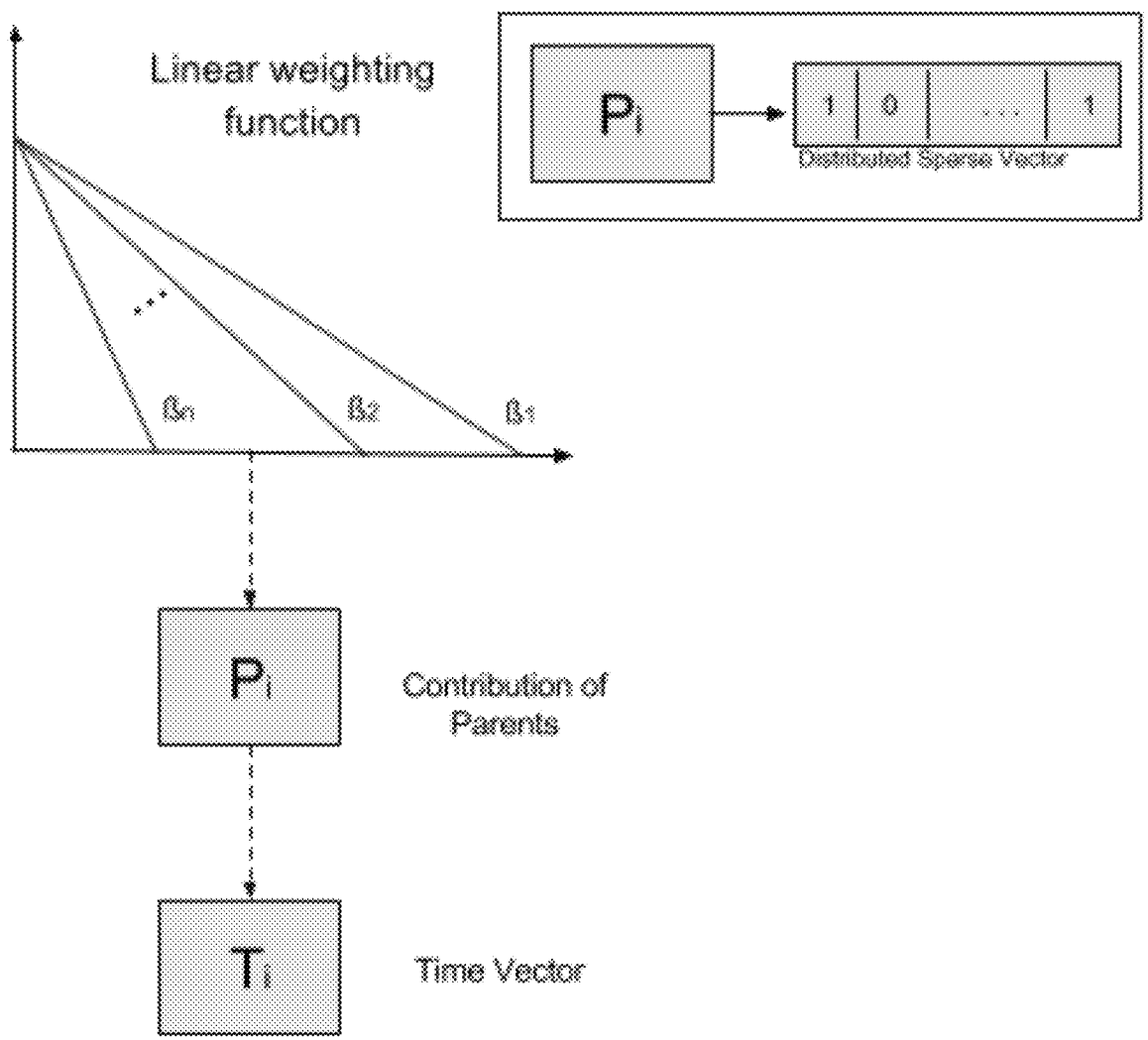
FIG. 1 shows the generation of a series of time vectors encoding the similarity of previous vectors.

Embodiments of the present invention are related to vector space modelling for entities that are ordinal in nature and span a linear dimension. For example, temporal categories like months in a year, hours in a day, etc. are ordinal in nature and span a linear dimension. Embodiments of the present invention include a computer-implemented method and system to generate vectors for linear, onotonic entities that have a finite span. As such, embodiments of the invention can be implemented in neural network models where the structural information of such linear entities is of importance but is otherwise not available in the prior art schemes of vector space modelling.

Embodiments of the present invention introduce a notion of structural information in the generation of vectors for situations when such structural information is crucial to information processing. For example, in one of the most popular forms of word vector generator, Word2Vec, the vectors for words like "January", "February", and so on, are located close to each other, hence show a high similarity, but there is no way to infer that these months occur in a sequence. In other words, by looking at the vectors we cannot know that "January" precedes "February" or that the distance between "January" and "February" is the same as "February" and "March." Embodiments of the present the invention aim at solving this issue by generating vectors that encode the structural information of linearly progressing entities.

Embodiments of the present invention particularly aim at aiding NLP systems to understand temporal information but can also be used beyond this scope. For example, sentences like "The shop will open after April" or "The meeting is between 10 and 11" clearly mention time-related entities. When these sentences are vectorised, it is crucial to know that the vector for "May" is just after the vector for "April", when the shop will be open. Similarly 10 and 11 are ordinal numbers and it is not enough to just know that they are numbers. Embodiments of the present invention address this issue where temporal information is encoded into vectors in a manner that has a natural interpretation.

Thus, overall embodiments of the present invention address the need to have structural information encoded in vector space modelling which goes beyond simple similarity and allows information processing, especially in temporal contexts to be directly interpreted in NLP scenarios.

Embodiments of the present invention can include a computer-implemented vector generating algorithm that generates vectors in a sequence. The vectors encode the spatial structure of the entities in a sequence and go beyond encoding semantic or co-occurrence similarity between underlying entities. Embodiments of the present invention enable knowledge of whether two entities are similar while also conveying additional information that allows a natural interpretation of where the entities lie in relation to others in a linear dimension. The vectors are generated using controlled correlation, such that the correlation of a vector decays as a function of distance from the initial vector. However, since only mere correlation is not enough to convey the spatial structure, embodiments of the present invention also make sure the dimensions of the vectors are populated in a way that reflect the natural position of the entities on a number line. The resulting vectors can also be used to convey cyclic patterns if present in the underlying entities. Since all such information is present in a vectoral representation, machine learning algorithms can easily learn over these vectors along with other information.

Embodiments of the present invention are described using time as an example, since such embodiments readily find a practical use for temporal information but can easily be extended to other linear ordinal entities. The motivation to encode time events into vectors is to allow a smooth integration into the general vectoral representation of large text documents or related metadata. Encoding time events into vectors enables various neural network or machine learning algorithms to easily process the temporal information contained in the documents. Thus, when direct references to temporal information in text are extracted, the invention can provide time vectors to the algorithm in the same space and dimensionality as the text vectors. The invention manifests the time vectors in such a way that they encode the linearity of time in the vector space. The sparsity of the vectors can be controlled by a parameter and depending on the application the vectors can range from sparse to dense. Similarly, the dimension of the vectors can be controlled as per the requirements of the application.

To represent time as a vector, we first generate a set of p random vectors of dimension d and assign them as "parent" vectors. All the vectors in the parent set are orthogonal to each other and thus form the basis for the generation of future "child" vectors. Each child vector represents a point on the timeline. The timeline is segmented according to the following time categories: years in a defined range, months of a year, days of a month, hours of a day, and minutes of an hour. Thus, within a time category, a child vector would represent particular year or month or day and so on. In the generation of a child vector, several parent vectors can participate. The number of parent vectors participating, and their contribution, is modulated by a linear function with a negative slope. For each subsequent child vector that is generated, the slope and intercept of the linear function is changed in a way that the new child vector has a weighted contribution from the parent vectors that produced the preceding child vectors and an additional set of new parent vectors. This process is continued until all the child vectors within that time category have been generated. The slope and the intercept are adjusted such that, for each production of a child vector, the contribution of parent vectors that produced the previous child vectors is gradually reduced.

The schematic equations of the invention generating vectors can be written as follows:

$$T_i = f(\Sigma_{j=0}^{i+n} P_j \beta_i)$$

$$\beta_i = -m(i)P_i + k(i)$$

$$m, k \propto i; k \geq \text{number of parents}$$

$$f(x) = \frac{1}{1+e^{-\alpha x}}$$

where $T_i$ is the $i^{th}$ time vector, P is the set of parent vectors and $\beta$ is the factor modulating the contribution of each parent vector. n is the base number of parent vectors that generate the $0^{th}$ vector. m and k are the slope and intercept of the linear function, respectively.

Thus, vectors at each time point have a unique representation, but at the same time they encode the temporal relation with other vectors in the vicinity, as shown in FIG. 1. The temporal distance can be calculated as a similarity measure of two vectors. Vectors in temporal space will share a low similarity whereas adjacent vectors will have the highest similarity. To query the exact timestamp of a document one may simply compare the time vectors associated with the documents.

Figure 2:
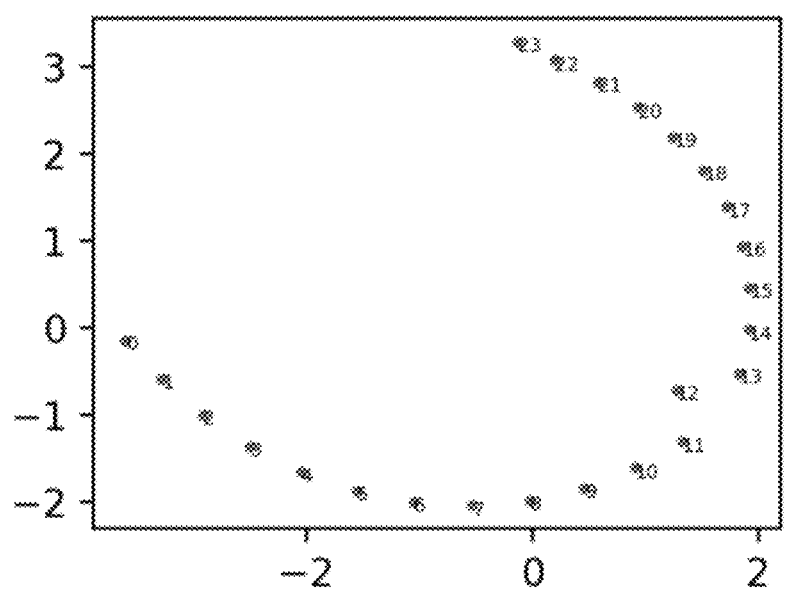
FIG. 2 shows an example of vectors for hours in a day when projected on 2 dimensions.
Figure 3:
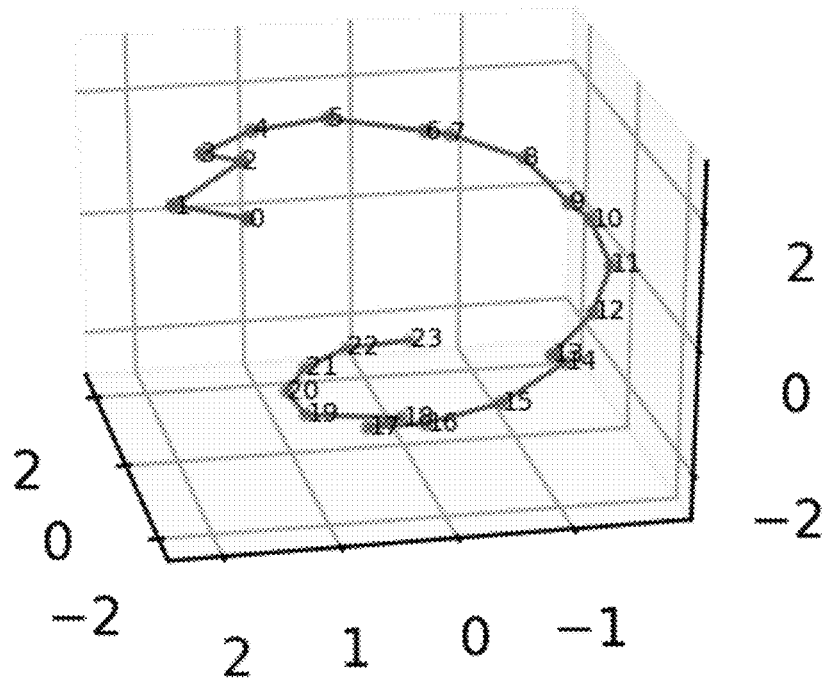
FIG. 3 shows an example of vectors for hours in a clay when projected on 3 dimensions.

The resulting vectors, when projected on lower dimensions using multi-dimensional-scaling (MDS) show the spatial structure of the vectors. FIG. 2 shows an example of vectors for hours in a day when projected on 2 dimensions. FIG. 3 shows an example of vectors for hours in a day when projected on 3 dimensions. The figures show a regular pattern in the placement of vectors in the n dimensional space.

The structure encoded in the vectors allows us to process information directly, for example, if the question is like:

Question: When is the monsoon season in southeast India?

Answer: Between October and December.

The difference between the sum of the values for the vectors "October" and "December" over all their dimensions is 4.79, while the mean difference between consecutive months for the same difference measure is 2.34226. Thus, using this information, then one can infer that the difference between "October" and "December" is roughly 4.79/2.34=2.05 months. Such kind of information cannot be extracted from the traditional form of vectorising of words using Word2Vec, GloVe, or the like.

Another example shows how the proximity between vectors, measured using cosine similarity, shows the sequential regular structure which is absent in the traditional form of vector generation. FIG. 4 shows the vectors most similar to "January" using the vectors generated by the invention and a prior art system, Word2Vec.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there in between.

Embodiments of the invention will generate vectors that follow a regular structure in the vector space. Thus, the vectors will naturally represent linear entities such as time. Embodiments of the invention will allow neural network or other machine learning algorithms to learn over temporal entities in natural text. Unlike dense vectors, the regular pattern in the vectors allow an easily interpretation of vectors, thus can be applied to temporal metadata. Embodiments of the invention can be used to convey information such as the cyclic patterns in time events and vectors can be used to represent calendar events.

Figure 5:
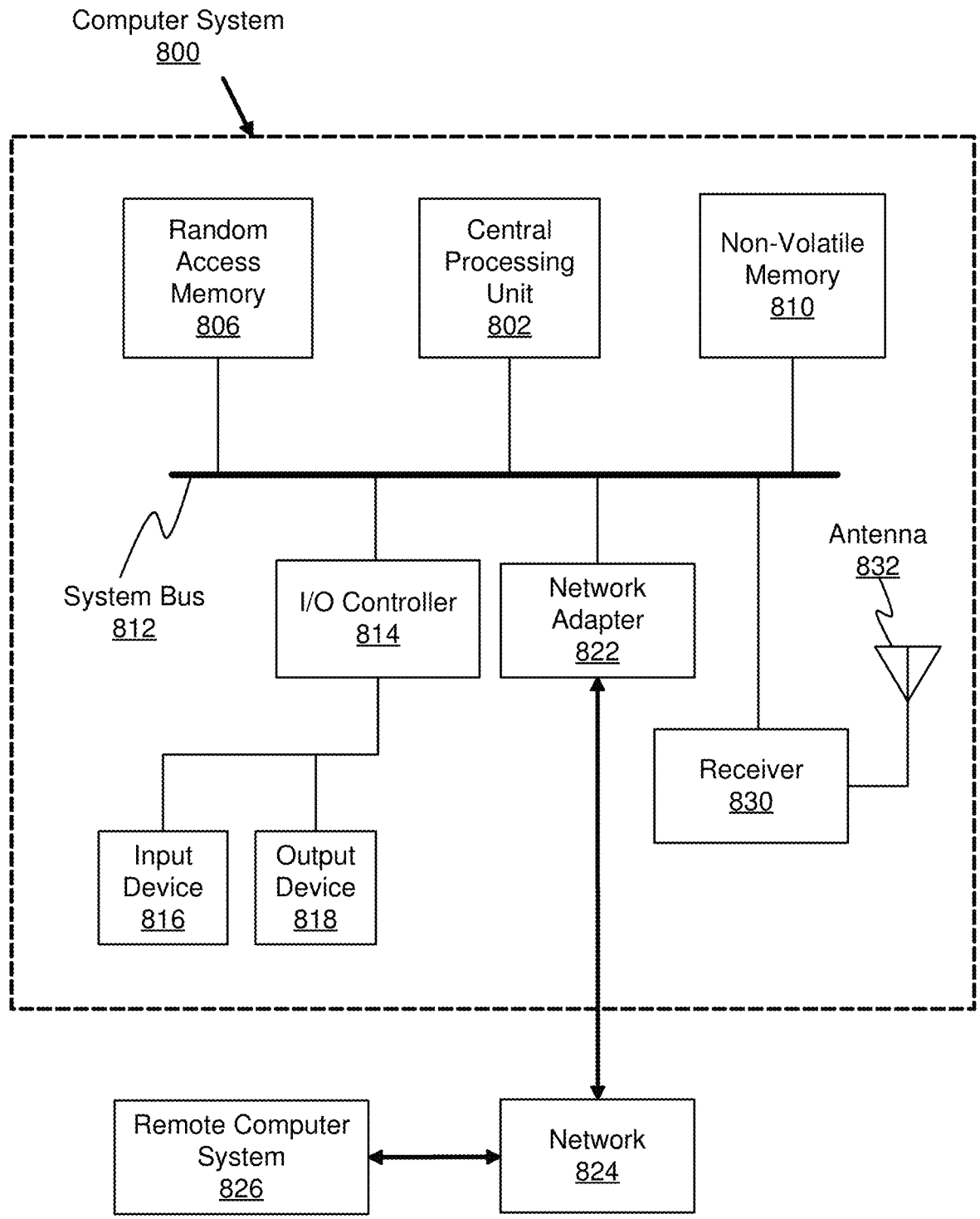
FIG. 5 shows a block diagram of a computer system 800 suitable for storing and/or executing a computer program in accordance with embodiments of the present invention.

FIG. 5 shows a block diagram of a computer system 800 suitable for storing and/or executing a computer program in accordance with embodiments of the present invention. Computer system 800 includes a central processing unit 802 having at least one microprocessor. Central processing unit 802 can be coupled directly or indirectly to memory elements through system bus 812. The memory elements comprise computer-readable memory capable of storing computer-executable instructions. The memory elements can include random access memory 806 employed during the actual execution of the program code and non-volatile memory 810 for longer term storage of data and instructions.

One or more input devices 816 and output devices 818 can be coupled to system bus 812 either directly or through an intervening input/output (I/O) controller 814. Examples of input device 816 include, but are not limited to, a pointing device, such as a mouse or a trackpad, or a keyboard. Examples of output device 818 include, but are not limited to, a display screen or a printer. Input device 816 and output device 818 can be combined into a single device, for example, as a touchscreen comprising a display screen (for displaying output to the user of computer system 800) having a touch-sensitive surface (for receiving input from the user of computer system 800).

One or more network adapters 822 may also be coupled to computer system 800 to enable the system to become communicatively coupled to remote computer system 826 or remote printers or storage devices through intervening private or public networks 824. Modems, cable modems, Ethernet cards, and wireless network adapters are just a few of the currently available types of network adapters. Computer system 800 can include one or more receivers 830. Receiver 830 receives wireless signals via antenna 832. Receiver 830 is adapted for receiving a data signal from a transmitting device. Receiver 1130 can comprise a transceiver capable of both transmitting and receiving wireless data signals, including but not limited to, wireless local area networking, Wi-Fi, Bluetooth, cellular radio signals (GSM, CDMA, UMTS, LTE, etc.), global positioning system (GPS) signals, near field communication (NFC) signals, and the like. While various component devices of computer system 800 are shown as separate component devices in FIG. 8 for purposes of description, the various component devices may be integrated into a single device, as is known in the art, such as a system-on-a-chip (SoC) device.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A computer-implemented method of vector space modelling in natural language processing to generate vectors for linear, monotonic entities having a finite span, the method comprising:

generating a set of p random vectors of dimension d;

assigning the set of p random vectors as parent vectors;

setting all the parent vectors orthogonal to each other;

generating a child vector from one or more of the parent vectors, in which a number of the parent vectors participating in generating the child vector, and a contribution the parent vectors participating in generating the child vector, is modulated by a linear function with a negative slope; and generating at least one subsequent child vector, wherein for each subsequent child vector that is generated, changing a slope and intercept of the linear function in a way that the subsequent child vector has a weighted contribution from the parent vectors that produced the preceding child vectors and an additional set of new parent vectors.

2. The method of claim 1, in which the slope and the intercept are adjusted such that, for each production of a child vector, the weighted contribution of the parent vectors that produced the preceding child vectors is gradually reduced.

3. The method of claim 1, in which the child vector represents particular year, or month, or day.

4. The method of claim 1, in which a plurality of child vectors is generated, each child vector representing a point on a timeline, the timeline segmented according to the following time categories: years in a defined range, months of a year, days of a month, hours of a day, and minutes of an hour.

5. The method of claim 4, in which the method is continued until all the child vectors within a time category have been generated.

6. The method of claim 1, in which the child vector is generated using controlled correlation, such that the controlled correlation of the child vectors decays as a function of distance from the parent vectors.

7. A computer system for vector space modelling in natural language processing to generate vectors for linear, monotonic entities having a finite span, the computer system comprising:
 a computer processor;
 a computer-readable memory coupled to the computer processor, the computer readable memory encoded with computer instructions that, when executed by the computer processor, cause the computer system to perform the steps of:
 generating a set of p random vectors of dimension d;
 assigning the set of p random vectors as parent vectors;
 setting all the parent vectors orthogonal to each other; and
 generating a child vector from one or more of the parent vectors, in which a number of the parent vectors participating in generating the child vector, and a contribution the parent vectors participating in generating the child vector, is modulated by a linear function with a negative slope,
 in which a plurality of child vectors is generated, each child vector representing a point on a timeline, the timeline segmented according to the following time categories: years in a defined range, months of a year, days of a month, hours of a day, and minutes of an hour.

8. The computer system of claim 7, in which the computer instructions that, when executed by the computer processor, further cause the computer system to performs a step of,
 for each subsequent child vector that is generated, changing a slope and intercept of the linear function in a way that the subsequent child vector has a weighted contribution from the parent vectors that produced preceding child vectors and an additional set of new parent vectors.

9. The system of claim 8, in which the slope and intercept are adjusted such that, for each production of a child vector, the weighted contribution of the parent vectors that produced the preceding child vectors is gradually reduced.

10. The system of claim 7, in which the child vector represents particular year, or month, or day.

11. The system of claim 7, in which the computer readable memory is encoded with computer instructions that when executed by the computer processor, cause the computer system to continue the steps the method is continued until all the child vectors within a time category have been generated.

12. The system of claim 7, in which the child vector is generated using controlled correlation, such that the controlled correlation of the child vectors decays as a function of distance from the parent vectors.

13. A non-transitory computer-readable medium encoded with computer instructions for vector space modelling in natural language processing to generate vectors for linear, monotonic entities having a finite span, the computer instructions, when executed by a computer system, cause the computer system to perform the steps of:,
 generating a set of p random vectors of dimension d;
 assigning the set of p random vectors as parent vectors;
 setting all the parent vectors orthogonal to each other; and
 generating a child vector from one or more of the parent vectors, in which a number of the parent vectors participating in generating the child vector, and a contribution the parent vectors participating in generating the child vector, is modulated by a linear function with a negative slope,
 in which the child vector is generated using controlled correlation, such that the correlation of the child vectors decays as a function of distance from the parent vectors.

14. The non-transitory computer-readable medium of claim 13, further including computer instructions, that when executed by a computer system, cause the computer system to, for each subsequent child vector that is generated, change a slope and intercept of the linear function in a way that the subsequent child vector has a weighted contribution from the parent vectors that produced preceding child vectors and an additional set of new parent vectors.

15. The non-transitory computer-readable medium of claim 14, in which the slope and the intercept are adjusted such that, for each production of a child vector, the weighted contribution of the parent vectors that produced the preceding child vectors is gradually reduced.

16. The non-transitory computer-readable medium of claim 13, in which the child vector represents particular year, or month, or day.

17. The non-transitory computer-readable medium of claim 13, in which a plurality of child vectors is generated, each child vector representing a point on a timeline, the timeline segmented according to the following time categories: years in a defined range, months of a year, days of a month, hours of a day, and minutes of an hour.

18. The non-transitory computer-readable medium of claim 17, in which the method is continued until all the child vectors within a time category have been generated.

* * * * *